(12) United States Patent
Haskin et al.

(10) Patent No.: US 11,884,238 B2
(45) Date of Patent: Jan. 30, 2024

(54) VEHICLE DOOR INTERFACE INTERACTIONS

(71) Applicant: Zoox, Inc., Foster City, CA (US)

(72) Inventors: Andrew Allen Haskin, San Francisco, CA (US); Auver Cedric Austria, San Francisco, CA (US)

(73) Assignee: ZOOX, INC., Foster City, CA (US)

( * ) Notice: Subject to any disclaimer, the term of this patent is extended or adjusted under 35 U.S.C. 154(b) by 78 days.

(21) Appl. No.: 17/507,720

(22) Filed: Oct. 21, 2021

(65) Prior Publication Data

US 2023/0127977 A1   Apr. 27, 2023

(51) Int. Cl.
| | |
|---|---|
| *B60R 25/24* | (2013.01) |
| *B60R 25/30* | (2013.01) |
| *B60K 35/00* | (2006.01) |
| *B60W 60/00* | (2020.01) |
| *H04W 4/40* | (2018.01) |
| *B60R 25/25* | (2013.01) |

(52) U.S. Cl.
CPC .............. *B60R 25/25* (2013.01); *B60K 35/00* (2013.01); *B60R 25/24* (2013.01); *B60R 25/305* (2013.01); *B60W 60/0016* (2020.02); *H04W 4/40* (2018.02); *B60K 2370/143* (2019.05); *B60K 2370/148* (2019.05); *B60K 2370/152* (2019.05); *B60K 2370/16* (2019.05); *B60K 2370/56* (2019.05); *B60K 2370/794* (2019.05)

(58) Field of Classification Search
CPC ......... B60R 25/25; B60R 25/24; B60R 25/30; H04W 4/40; B60W 60/0016; B60K 35/00; B60K 2370/56; B60K 2370/143; B60K 2370/152; B60K 2370/16; B60K 2370/148; B60K 2370/794
See application file for complete search history.

(56) References Cited

U.S. PATENT DOCUMENTS

| | | | |
|---|---|---|---|
| 8,892,272 B1 * | 11/2014 | Wooding ............... | B60R 25/252 701/2 |
| 10,466,698 B1 * | 11/2019 | Valasek ................ | G05D 1/0061 |
| 10,501,055 B1 * | 12/2019 | Yi .......................... | B60R 25/257 |

(Continued)

FOREIGN PATENT DOCUMENTS

| | | |
|---|---|---|
| KR | 20200017596 A | 2/2020 |
| WO | WO-2020157108 A1 * | 8/2020 |

OTHER PUBLICATIONS

PCT Search Report and Written Opinion dated Jan. 19, 2023 for PCT Application No. PCT/US22/45653, 11 pages.

*Primary Examiner* — Chico A Foxx

(74) *Attorney, Agent, or Firm* — Lee & Hayes P.C.

(57) ABSTRACT

Techniques for interacting with authorized and unauthorized users by a door interface component are discussed herein. A vehicle computing device can implement the door interface component and/or an authentication component to control operation of a door of the vehicle or initiate a communication for assistance. For instance, the door interface component can include a button, that provides different visual indicators and functionality based on whether the user is authorized to enter the autonomous vehicle (e.g., open a door or provide visual indicators for the user to select to cause the door to open) or to request to move the vehicle, initiate hiring the vehicle, or call for help when the user is unauthorized to enter the autonomous vehicle.

20 Claims, 7 Drawing Sheets

(56) References Cited

U.S. PATENT DOCUMENTS

| | | | |
|---|---|---|---|
| 10,633,003 B1* | 4/2020 | Abundis Vargas | H04W 4/027 |
| 10,665,140 B1 | 5/2020 | Ahn | |
| 10,953,852 B1* | 3/2021 | Krishnamurthi | G05D 1/0276 |
| 11,458,929 B1* | 10/2022 | Anderson | G06Q 10/02 |
| 11,624,228 B1* | 4/2023 | Austria | E05F 15/73 |
| | | | 340/5.72 |
| 2006/0007005 A1* | 1/2006 | Yui | G07C 9/00309 |
| | | | 340/5.1 |
| 2012/0032463 A1* | 2/2012 | Gerndorf | B60R 13/025 |
| | | | 296/1.08 |
| 2014/0195109 A1* | 7/2014 | Lange | E05B 81/76 |
| | | | 701/36 |
| 2015/0179370 A1* | 6/2015 | Delande | G05G 1/02 |
| | | | 200/513 |
| 2015/0233719 A1* | 8/2015 | Cudak | B60R 25/241 |
| | | | 701/23 |
| 2016/0221501 A1* | 8/2016 | Linden | B60R 25/34 |
| 2017/0132934 A1* | 5/2017 | Kentley | G08G 1/202 |
| 2018/0290627 A1 | 10/2018 | Hariri | |
| 2018/0354411 A1 | 12/2018 | Friedland | |
| 2019/0031144 A1* | 1/2019 | Gat | B60R 25/25 |
| 2019/0033868 A1* | 1/2019 | Ferguson | G06K 7/10297 |
| 2019/0051069 A1* | 2/2019 | Cooley | G10L 17/22 |
| 2019/0061619 A1* | 2/2019 | Reymann | B60Q 9/00 |
| 2019/0227553 A1* | 7/2019 | Kentley-Klay | B60L 58/12 |
| 2019/0299933 A1* | 10/2019 | Suzuki | G05D 1/0088 |
| 2020/0010051 A1* | 1/2020 | Dumov | G06V 40/172 |
| 2020/0151467 A1* | 5/2020 | Wunsche, III | G08G 1/205 |
| 2020/0223397 A1* | 7/2020 | Sakai | G06V 20/58 |
| 2020/0238953 A1* | 7/2020 | Spasovski | G01C 21/3407 |
| 2021/0061224 A1* | 3/2021 | Kim | H04L 63/0861 |
| 2021/0073363 A1* | 3/2021 | Talha | B60R 25/24 |
| 2021/0213957 A1* | 7/2021 | Brown | G07C 9/00309 |
| 2021/0221400 A1* | 7/2021 | Yu | E05F 15/72 |
| 2021/0229631 A1 | 7/2021 | Golgirl | |
| 2022/0089003 A1* | 3/2022 | Ichinose | E05F 15/43 |
| 2022/0186533 A1* | 6/2022 | Prince | E05B 81/77 |
| 2022/0390938 A1* | 12/2022 | Villar | B60R 25/24 |
| 2022/0410841 A1* | 12/2022 | Anderson | B60W 60/0013 |
| 2023/0041503 A1* | 2/2023 | Salter | E05F 15/60 |

* cited by examiner

VEHICLE DOOR INTERFACE INTERACTIONS

BACKGROUND

When using a ride-sharing service, such as taxis, a driver may limit or grant ingress and egress permissions to a user, as well as communicate with the user regarding more complex interactions. In those situations in which no human driver is present, for example in the case of autonomous vehicles, a pedestrian or potential passenger may not otherwise be able to communicate with a driver for such more complicated interactions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
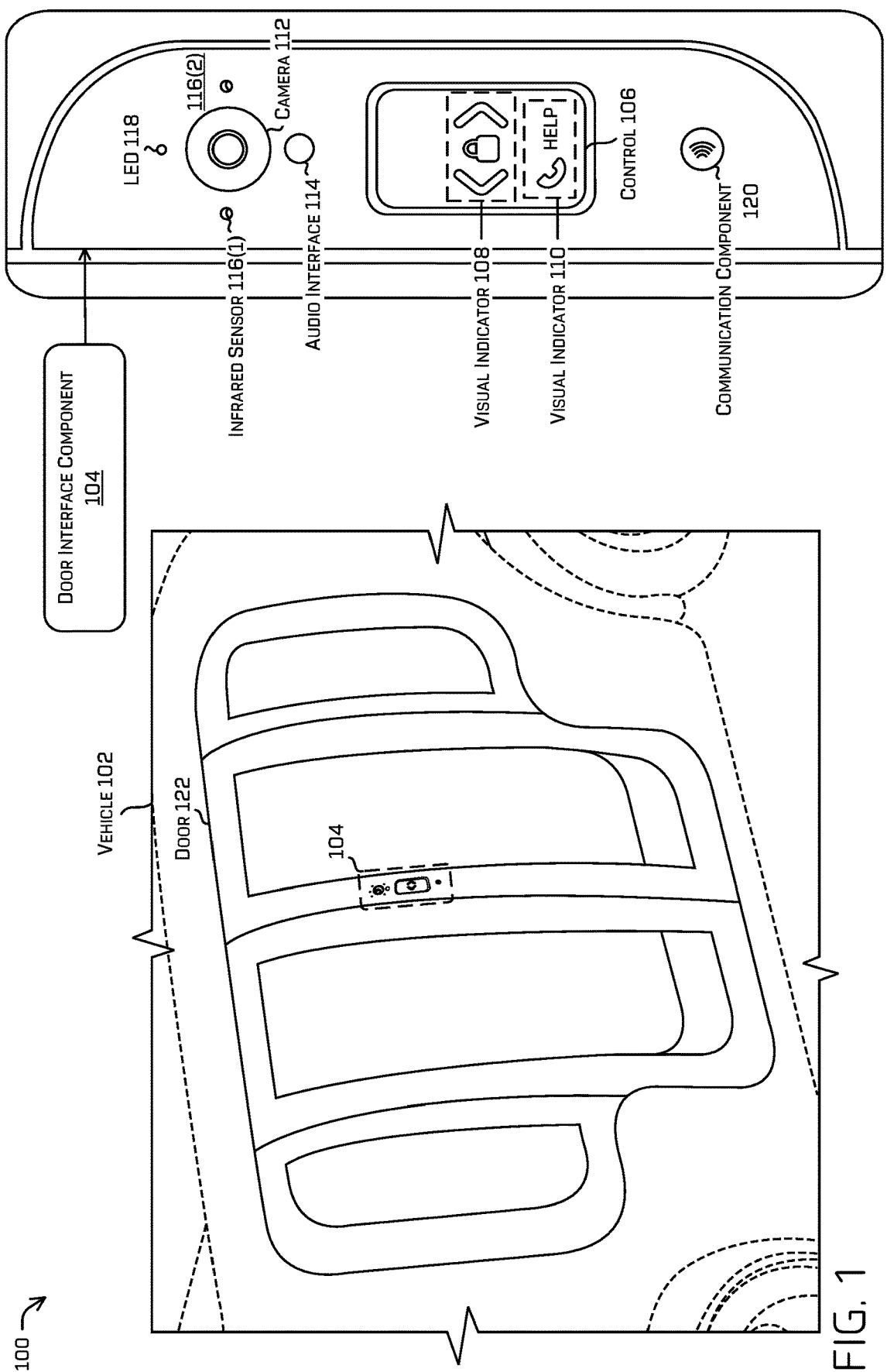
FIG. 1 is an illustration of an example environment in which an example door interface component determines an action for an example vehicle.

As discussed above, existing vehicles typically include a handle, button, or other opening mechanisms to control operation of a door for a passenger or other authorized user to enter and exit, while preventing or limiting unauthorized users from entering or accessing the autonomous vehicle. However, in some instances, it may be desirable for the vehicle to interact with a user (whether or not authorized) for more complex scenarios, such as to enable the unauthorized user to initiate hiring the vehicle, to communicate an emergency, and/or to request that the vehicle move out of the path of another vehicle.

This application relates to techniques for interacting with authorized and unauthorized users by a door interface component of a vehicle. The techniques can include a vehicle computing device that implements a door interface component to respond differently to a user based on whether the user is authorized to interact with the autonomous vehicle. For instance, the door interface component may be coupled to a door of the autonomous vehicle and include a control, such as a button or sensor, for interacting with the user. In various examples, after receiving an input associated with the control, the door interface component may operate the door (e.g., open and/or close the door) based on the user being associated with the autonomous vehicle (e.g., the user has been authenticated to use the autonomous vehicle based on, for example, for a fee, having been validated as an authorized user, etc.). In some examples, based on the user not being associated with the autonomous vehicle (e.g., the user has not been authenticated and/or initiated a request for a ride), the door interface component may output instructions to cause the autonomous vehicle to move, authorize the user, and/or initiate a communication with a remote operator or emergency personnel, just to name a few. Thus, the control of the door interface component may perform differently depending on, among other things, whether a user is authorized to access or use the vehicle. By implementing the techniques described herein, interactions with the vehicle can be accurately and efficiently processed and identified, thereby improving the overall safety of the vehicle.

Generally, the door interface component implemented by the vehicle computing device may provide functionality to determine interactions between a vehicle and a human responsive to receiving an input from a button, sensor, or other control associated with a door. In some examples, the vehicle may be operating as a ride service to transport authorized user(s) to a destination, and the door interface component can determine a first set of operations (e.g., open one or more doors and/or direct the user to one of multiple doors that is safest to enter) based on the input being received from an authorized user or a device or token associated with the authorized users (e.g., a mobile device of the user). In various examples, the door interface component can, upon determining that the user is not authorized, determine a second set of operations to interact with the unauthorized user. By way of example and not limitation, the second set of operations may include causing the vehicle to move (e.g., to avoid blocking another vehicle, driveway, etc.), to initiate a communication (e.g., to contact a remote operator or an emergency service provider such as police, fire, medical, etc.), begin an authorization sequence, or the like. In this way, the vehicle can be controlled in an environment based at least in part on the input from the button of the door interface component regardless of whether the input was associated with an authorized user (e.g., an authenticated user) or an unauthorized user (e.g., an unauthenticated user proximate the vehicle).

By way of example and not limitation, the vehicle may be parked while waiting to pick up a user that hired the vehicle (e.g., a passenger) via an application of a mobile device (or other hiring technique). The vehicle can detect that the user is nearby based at least in part on location services tracking the user's phone (e.g., based on GPS), a signal (e.g., Bluetooth, Zigbee, WiFi, ultrasonic, etc.) transmitted between the user's phone and the vehicle, near field communication (NFC) when the user waves their phone near the door interface component, and/or biometric identification (e.g., facial recognition, iris recognition, fingerprint recognition, etc.). When the authenticated passenger interacts with a button, sensor, or other control of the door interface component, the door may open, or if the door closest to the passenger is unsafe to enter due to an obstacle (or other reason), then the door interface component can output a visual indicator (e.g., an image, text, video, etc.) and/or audio prompt to direct the passenger to another door on the other side of the vehicle.

In some examples, the vehicle may be parked and a person that has not been authorized to enter the vehicle may interact with the button. In such examples, the door interface component can provide functionality to present options to initiate moving the vehicle (e.g., cause the vehicle to move to a different location, initiate a call to a remote operator to determine whether and/or where to move the vehicle, etc.), initiate operations to enable to user to hire the vehicle (e.g., by initiating a call to a remote operator, requesting and/or receiving destination and/or payment information), and/or sending a request for help (e.g., transmit a communication to an emergency service provider). In this way, the door interface component enables safer operation of the vehicle by providing different outputs or interactions depending upon an authentication state of a user interacting with the button.

In another example, a passenger may be inside the vehicle, and a person outside of the vehicle notices that the passenger needs help (e.g., due to a medical condition or other reason). In such examples, the person can press the button of the door interface component to initiate an emergency communication for sending to the passenger, an emergency service provider, and/or a remote computing device associated with the vehicle. Using the techniques described herein, the vehicle can render assistance to the passenger within the vehicle based on receiving the input at the door interface component outside the vehicle.

In some examples, the techniques described herein can include the vehicle computing device authenticating a user interacting with a control of the door interface component. The control can be a button with a first position and a second position and the interaction can include the user pressing the button to cause a change between the first position and the second position. In some examples, interacting with the control can include a sensor (e.g., a camera, an ultrasonic sensor, an infrared sensor, and the like) of the door interface component to detect presence of the user. When the button is pressed or a user is detected near a door by the sensor, the door interface component can send a request for an authentication state of the user to the vehicle computing device. In some examples, the vehicle computing device can send a communication to the door interface component indicating that the user is associated with an authenticated state (e.g., authorized to enter the vehicle) or that the user is associated with an unauthenticated state (e.g., not authorized to enter the vehicle). In examples when the user is associated with the authenticated state, the door interface component can output an instruction, a visual indicator, and/or a communication to operate the door of the autonomous vehicle between a first position (e.g., a closed position) and a second position (e.g., an open position). In examples when the user is associated with the unauthenticated state, the door interface component can output different instruction, visual indicator, and/or a communication to authorize the user, move the vehicle from a current position, and/or call for emergency assistance, just to name a few.

As mentioned, the door interface component may determine a first set of visual indicators to convey options to the user when the user is authenticated (e.g., a door open indicator, a use other door indicator, a door lock/unlock indicator, etc.). For example, the user may be authorized to enter the vehicle, but the door associated with the input may be unsafe to enter (e.g., is within a threshold distance of another object that is stationary or moving and that may intersect with the user or the door if the user attempts to use the door). To enable the user to safely enter the vehicle, the door interface component can output an indicator for the user to enter the vehicle using another door while also outputting an indicator that the doors are locked. Additional examples of visual door indicators are discussed throughout this disclosure including in relation to FIGS. 1-7.

The door interface component may determine a second set of visual indicators to convey options to the user when the user is unauthenticated (e.g., a communication indicator, a move vehicle indicator, a door lock/unlock indicator, etc.). In such examples, one or more visual indicators can be presented in an area within, or adjacent to, the button to enable the user to hire the vehicle (initiate a hiring process at the vehicle and/or using a remote operator), request that the vehicle move position (e.g., navigate in an environment to another location), and/or request that a communication be sent to a remote operator and/or emergency personnel. Based on an interaction with the control and a currently presented visual indicator, the door interface component can enable the control (e.g., a single button with two positions) to initiate multiple different types of operations or actions.

In some examples, authenticating a user can include an authentication component verifying a current authentication state of the user interacting with the control. Functionality associated with the authentication component can be included in a vehicle computing device and/or the door interface component 104. The authentication state can include an authenticated state or an unauthenticated state. The authenticated state can be based on proximity of a mobile device of the user to the vehicle, an application on the mobile device of the user to the vehicle, a machine-readable code, or biometric identification, just to name a few. That is, the authentication component of the vehicle computing device can determine whether to authorize the user to enter the vehicle as an authenticated state based on a distance between the user and the vehicle being within a threshold distance (e.g., a sensor detecting the mobile device of the user within 3 meters of the vehicle). The authentication component may also authorize the user based on the user using an application of a mobile device or other computing device to hire the vehicle, the user interacting with the machine-readable code (e.g., a Quick Response (QR) code, barcode, Radio Frequency Identification (RFID) tag, and so on), or biometric identification (e.g., facial recognition, iris recognition, fingerprint, and the like). Additional examples of the authentication component determining an authentication state are discussed throughout this disclosure including in the following figures.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians (e.g., authorized and unauthorized users), bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine presence of a user adjacent to the door interface component.

The techniques discussed herein can improve a functioning of a computing device of a vehicle in a number of ways.

For example, a door interface component of a vehicle computing device can receive an input at a control and process the input to cause different vehicle operations based on an authentication state of an operator of the control. In some examples, the door interface component improves functioning and safety of the vehicle by enabling the vehicle to navigate to a safer location to pick up an authorized user or responsive to an unauthorized user requesting that the vehicle move from blocking a person or vehicle. In addition, the techniques described herein can improve passenger comfort and/or vehicle safety such as, for example, indicating a safest door to enter from among multiple doors based on sensor data. In some examples, a single button can achieve multiple different functions thereby reducing a number of buttons or other controls necessary. Utilizing the determinations by the door interface component, a vehicle computing device can improve the accuracy and/or reduce a latency for the vehicle to respond to a potential emergency in the environment.

In various examples, a vehicle computing device can improve safety of a vehicle by predicting a trajectory for the vehicle based at least in part on an instruction or communication output by the door interface component. For instance, a planning component of the vehicle computing device can determine the trajectory for the vehicle that is most likely to avoid an object based on the door interface component sending the planning component a communication indicating that a door is blocked or otherwise unsafe to enter.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100 in which an example door interface component determines an action for an example vehicle. For instance, a vehicle 102 can include a vehicle computing device (e.g., vehicle computing device 604 of FIG. 6) and/or a remote computing device (e.g., computing device(s) 636 of FIG. 6) that implements a door interface component 104. While described as a separate system, in some examples, interaction techniques described herein may be implemented by other vehicle systems, components, and/or computing devices. For example, and as will be described in further detail with regard to FIG. 6, the interaction techniques described herein may be implemented at least partially by or in association with a localization component 620, a perception component 622, a prediction component 624, and/or a planning component 626.

In some examples, the door interface component 104 can comprise a control 106 which includes visual indicator 108 and visual indicator 110, a camera 112, an audio interface 114 (e.g., a speaker and/or a microphone), infrared sensors 116(1) and 116(2), a light emitting diode (LED) 118, and a communication component 120 (e.g., an antenna, a transceiver, etc.).

The vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

The example vehicle 102 can include a door 122 (e.g., an opening for a passenger to enter and exit) on at least one side of the vehicle. Each door can be made up of any number of sections, panels, or portions that are moveable to create the opening for the passenger. In some examples, the vehicle 102 may be configured with a door on each side of the vehicle. The door interface component 104 can be included in each door, or in a panel of the vehicle adjacent each door, to provide the interaction techniques described herein.

In some examples, the door interface component 104 can receive an input at the control 106 and determine an authentication state of a user associated with the input. For instance, an authentication component (not shown) associated with the vehicle computing device or included as part of the door interface component 104, can determine the authentication state (e.g., an authenticated state or an unauthenticated state) based on receiving an indication of the input from the door interface component 104. Responsive to receiving the authentication state from the authentication component, the door interface component 104 can output different instructions to control the vehicle 102 (e.g., send an instruction to another component of the vehicle computing device), communicate with the user, and/or communicate with a computing device remote from the vehicle 102 (e.g., a device of a remote operator that can authorize the user or a device associated with an emergency service).

In some examples, the door interface component 104 can be coupled to the door 122 of the vehicle 102. The control 106 can represent a button, such as a mechanical button, having a first position and a second position. In examples that the control 106 comprises a single button with two positions, the door interface component 104 can determine different types of interactions with the user based on the authentication state of the user. As discussed herein, the door interface component 104 can provide more complex functionality than is typical of a two position button. In particular, the door interface component 104 can determine an action based at least in part on the visual indicator 108, the visual indicator 110, and/or an authentication state of the user. For example, an unauthorized user can receive a first set of visual indicators (e.g., the visual indicator can be green to represent an unlocked door) and an authorized user can receive a second set of visual indicators (e.g., the visual indicator can be red to represent a locked door).

The visual indicator 108 and visual indicator 110 can change appearance (e.g., color, size, animation, etc.) based on the authentication state and to correspond to different actions. For example, the door interface component 104 can determine different configurations of the visual indicators 108 and 110 for presentation on a display device such as a surface of the control 106, a Liquid Crystal Display (LCD), or other display type. As shown in FIG. 1, the control 106 comprises the visual indicator 108 showing arrows (in a variety of colors, sizes, light intensities, etc.) and a lock symbol to communicate an opening status, a closing status, or a lock status for the door 122. For instance, green arrows an absence of the lock can indicate that an authenticated user can interact with (e.g., press) the control 106 to cause the door to open. In some examples, red arrows may be presented with the lock symbol to indicate that the door 122 is locked.

Generally, the door interface component 104 can determine a green lock symbol to associate with the visual indicator 108 and/or the visual indicator 110 to represent that the user is authenticated, but attempting to use a door that is less safe than another available door. Green arrows can indicate that the door 122 may be opened responsive to the user pressing the control 106, interacting with an application, and/or being identified while approaching the door 122 (e.g., the door can automatically open without user input). A red lock and/or red arrows can be associated with the visual indicator 108 and/or the visual indicator 110 to indicate that the door may not be opened.

In examples, when the user attempts to enter a door that is less safe to enter than another door, the visual indicator 108 can present red arrows, a do-not-enter symbol, "other door" or "use other door" text, and the like. The door interface component 104 can determine a safest door for a passenger to enter based at least in part on sensor data associated with the vehicle 102. For instance, the sensor data can indicate that an object (e.g., a parked car, a pedestrian, etc.) is blocking a door, a fault in the door renders it inoperable, and that another door is clear for entry. In some examples, the door interface component 104 can determine a safest door to enter based at least in part on receiving data from the user indicating that the user cannot physically enter the door.

In some examples, the door interface component 104 can present the visual indicator 110 with information including one or more words and/or one or more symbols (shown in FIG. 1 as "HELP" and a phone symbol) to communicate that pressing the control 106 initiates a communication. In examples when an authenticated user initiates an interaction with the vehicle 102 via the control 106 and/or via an application associated with a device of the user, the control 106 can be used to receive assistance from a remote operator (e.g., the door interface component 104 can initiate a communication to a remote computing device of a fleet service, an emergency service, and so on). In this way, the authenticated user can receive emergency help from an emergency service or receive assistance with the vehicle from the fleet service (e.g., request that the vehicle be cleaned, relocated, or other reasons).

The door interface component 104 can also or instead present the visual indicator 110 to communicate or interact with an unauthenticated user that either pressed the control 106 or was detected in the vicinity of the vehicle 102 using one or more sensors. In such examples, an interaction with the control 106 can include the user pressing the control 106, or a sensor detecting movement from the unauthenticated user indicative of a selection of the control 106 (e.g., eye tracking, hand movements, verbal commands, and the like can be used to interact with the control 106). For example, an unauthenticated user can be detected in a vicinity of the vehicle 102 and a visual indicator(s) can be output for display, that is interacted with by the unauthenticated user, can cause the vehicle 102 to determine a trajectory to navigate to a new location and/or cause the vehicle computing device to request assistance at the vehicle 102.

In various examples, the door interface component 104 can present the visual indicator 108 at a different time (e.g., before or after) than presentation of the visual indicator 110 while in other examples both the visual indicator 108 and the visual indicator 110 can be presented simultaneously. In some examples, the visual indicator 108 and the visual indicator 110 can comprise a single visual indicator that changes appearance based on an authentication status of a user associated with an input and a number of times the control 106 is pressed or otherwise interacted with by the user. Additional examples for presenting the visual indicators 108 and 110 are discussed throughout this disclosure including in relation to FIGS. 2-7.

In some examples, the door interface component 104 can present "help" text and/or a phone symbol in association with the visual indicator 108 or the visual indicator 110. For example, the phone/help indications can be presented during ingress and egress by a passenger, while the vehicle 102 is navigating in an environment 100 (with or without a passenger). In this way, the door interface component 104 can receive a request from an authenticated user and/or an unauthenticated user to render aid for themselves, or another person inside or outside of the vehicle 102. In one non-limiting example, an unauthenticated user outside the vehicle 102 can request help for a passenger inside the vehicle by interacting with the control 106 while it presents the phone/help indications. In such examples, the door interface component 104 can send a communication for emergency assistance directly from the vehicle 102 to an emergency service provider and/or send a communication to a remote operator to remotely operate the door 122 (e.g., open the door so the passenger can receive help).

In some examples, an authenticated user can press the control 106 while the visual indicator 108 and/or the visual indicator 110 present "help" text and/or a phone symbol to initiate an authentication process to enter the vehicle 102 (e.g., to retrieve left belongs such as a mobile device that would otherwise be available to use an application to operate the door for re-entry).

As illustrated in FIG. 1, the door interface component 104 can detect presence of the user proximate the vehicle using one or more sensors including the camera 112, the audio interface 114, the infrared sensors 116(1) and 116(2), another sensor of the vehicle 102, or a sensor remote from the vehicle 102. For instance, the camera 112 can capture an image of the user and determine the authentication state based on the image (e.g., compare the image to images associated with an authorized user). In some examples, a user that completes an authentication process (e.g., verifying an identity, verifying payment, etc.) can be recognized by the vehicle 102 using the camera 112, and the visual indicator 108 can include green arrows to indicate the door 122 is unlocked. In various examples, the camera 112 can use the one or more infrared sensors 116(1) and 116(2) to capture the image.

In various examples, the LED 118 can change animation and color to convey operation of the camera 112 to the user. For example, the LED 118 can output a green light that flashes to indicate that an image is about to be captured, and a continuous green light to indicate that the camera 112 is capturing an image. In some examples, functionality associated with the LED 118 can be included in a display of the control 106, or other area of the door interface component 104.

Generally, the audio interface 114 is configured to output and/or receive audio signals to interact with the user (e.g., present information about the door interface component 104 functionality using a speaker, receive audio by a microphone, and so on). The audio interface 114 can, for example, indicate a period of time to receive an additional input, and associate the additional input with an action based on the period of time and the authentication state of the user. For instance, the audio interface 114 can provide audio to convey when to press the control 106 to initiate an action to open the door, an action to hire the vehicle 102, an action to request emergency assistance, or an action to communicate with a passenger within the vehicle 102, though other actions are also contemplated. In some examples, the audio interface 114 can comprise an ultrasonic sensor to generate signals usable to enable a user to access the vehicle 102 (e.g., an ultrasonic signal to determine a distance to the user to enable the door to operate automatically based on the distance between the user and the vehicle).

In various examples, audio from the audio interface 114 can accompany various visual indicators to communicate with the user. For example, the audio interface 114 can indicate which door to use, when to press the control 106 to activate certain functionality, how to make a payment to hire the vehicle, how to initiate a communication (e.g., including outputting a ringing tone), warning signals when the door is operating, and so on.

As mentioned above, the authentication component can determine whether a user proximate the door interface component 104 is associated with the authenticated state or the unauthenticated state. In some examples, the authentication component can determine the authentication state for the user that interacted with the door interface component 104 via the camera 112, another sensor, the control 106, and/or the communication component 120 (e.g., an antenna associated with a proximity technology such as Near-Field Communication (NFC)). For instance, determining the authentication state can be based on the vehicle 102 detecting a proximity of a mobile device of the user (e.g., Bluetooth, ultrawideband, NFC, WiFi, ultrasonic, and others). In various examples, the authentication component may receive and/or access credentials from another entity such as an application used by the user to hire the vehicle 102, and verify the authentication state based at least in part on the credentials.

In some examples, authentication of the user by the door interface component 104 can be based at least in part on a machine-readable code (e.g., a Quick Response (QR) code, barcode, or Radio Frequency Identification (RFID) tag. For instance, authentication may be initiated by the user accessing a QR code associated with the vehicle (e.g., displayed on an exterior surface of the vehicle 102, within the control 106, in an application, etc.). The door interface component 104 can also or instead initiate authentication based on scanning a barcode or detecting an RFID tag (e.g., as may be presented by a user's device). The machine-readable code can also be scanned by a user to initiate hiring the vehicle 102, request that the vehicle move, among other potential actions.

In various examples, the authentication state (e.g., an association between the user and the vehicle 102) can be based at least in part on biometric identification associated with the user. For instance, the authentication component can identify the user based on facial recognition, iris recognition, fingerprint recognition, etc., and determine whether the identified user is authorized to enter the vehicle (e.g., was authenticated during hiring of the vehicle 102).

In various examples, the door interface component 104 can output an instruction to initiate, generate, or otherwise determine a communication for sending over a network to a device associated with an emergency service provider (e.g., police, fire, ambulance, and the like). For instance, when an unauthenticated user interacts with the control 106 and the visual indicator 110 presents an image representing a request for help (e.g., help text, a phone, transmission waves, etc.), the door interface component 104 can transmit a communication indicating a request for help to the emergency service provider.

In various examples, a vehicle computing device associated with the door interface component 104 may be configured to receive sensor data representing object(s) of the environment 100, such as via a perception component (e.g., the perception component 622). In some examples, the sensor(s) may include sensors mounted on the vehicle 102, and may include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example, sensors mounted on another autonomous vehicle, and/or sensors mounted in the environment 100. In various examples, the vehicle 102 may be configured to transmit and/or receive data from other autonomous vehicles. The data may include sensor data and/or state data, such as sensor data associated with the environment 100.

In various examples, the door interface component 104 can determine functionality to associate with the control 106 based at least in part on the sensor data. For example, the sensor data may be used to detect presence of, a distance to, and/or an identification of one or more users surrounding the vehicle 102. The door interface component 104 can output an instruction to open a door, enable hiring the vehicle, or communicate with another computing device associated with a user and/or a remote operator. In one example, the sensor data can be used to enable a user to enter the vehicle 102 such as when the user does not have a mobile device (or left a mobile device within the vehicle). As described herein, a mobile device can include a phone, a wearable device (watch, glasses, etc.), a key, a card with machine readable code, etc.

Generally, the door interface component 104 can enable a user inside or outside the vehicle to communicate with the vehicle 102 for a variety of reasons. For instance, when a mobile device is not available or an application cannot be accessed, the door interface component 104 enables a user to enter and exit the vehicle, book a ride (e.g., hire the vehicle), and/or cause the vehicle to change position in the environment. The door interface component 104 can also, or instead, enable communication between a user inside the vehicle and a user outside the vehicle (e.g., a rider inside needs help, and the non-rider outside the vehicle can summon help, a rider inside can authorize another user to enter the vehicle, and so on).

A user at an airport, hotel, or other location can use the door interface component 104 to hire the vehicle 102 without requiring that the user register via an application, for instance. In one specific example, the user may receive a machine readable code (e.g., QR code, bar code, etc.) from a device associated with the airport, the hotel, or other entity, and the vehicle 102 can authenticate the user by capturing an image of the machine readable code. For example, the user may obtain a travel voucher having the machine readable code that includes destination and/or payment information (e.g., from the hotel concierge) and may presents the voucher to the vehicle 102 to hire the vehicle. The vehicle 102 may scan the voucher using a camera or scanner in order to authenticate the user.

In various examples, a key card, such as a hotel key card, can store credentials for accessing the vehicle 102, and the user can scan the key card at the communication component 120 (e.g., an NFC antenna) of the door interface component 104 to interact with the vehicle 102.

In some examples, enabling a user to hire the vehicle 102 can include receiving destination and/or payment information from a user via voice commands. For example, the user may be prompted to provide destination and payment information verbally to hire the vehicle 102 (using the audio interface 114, for example).

Figure 2:
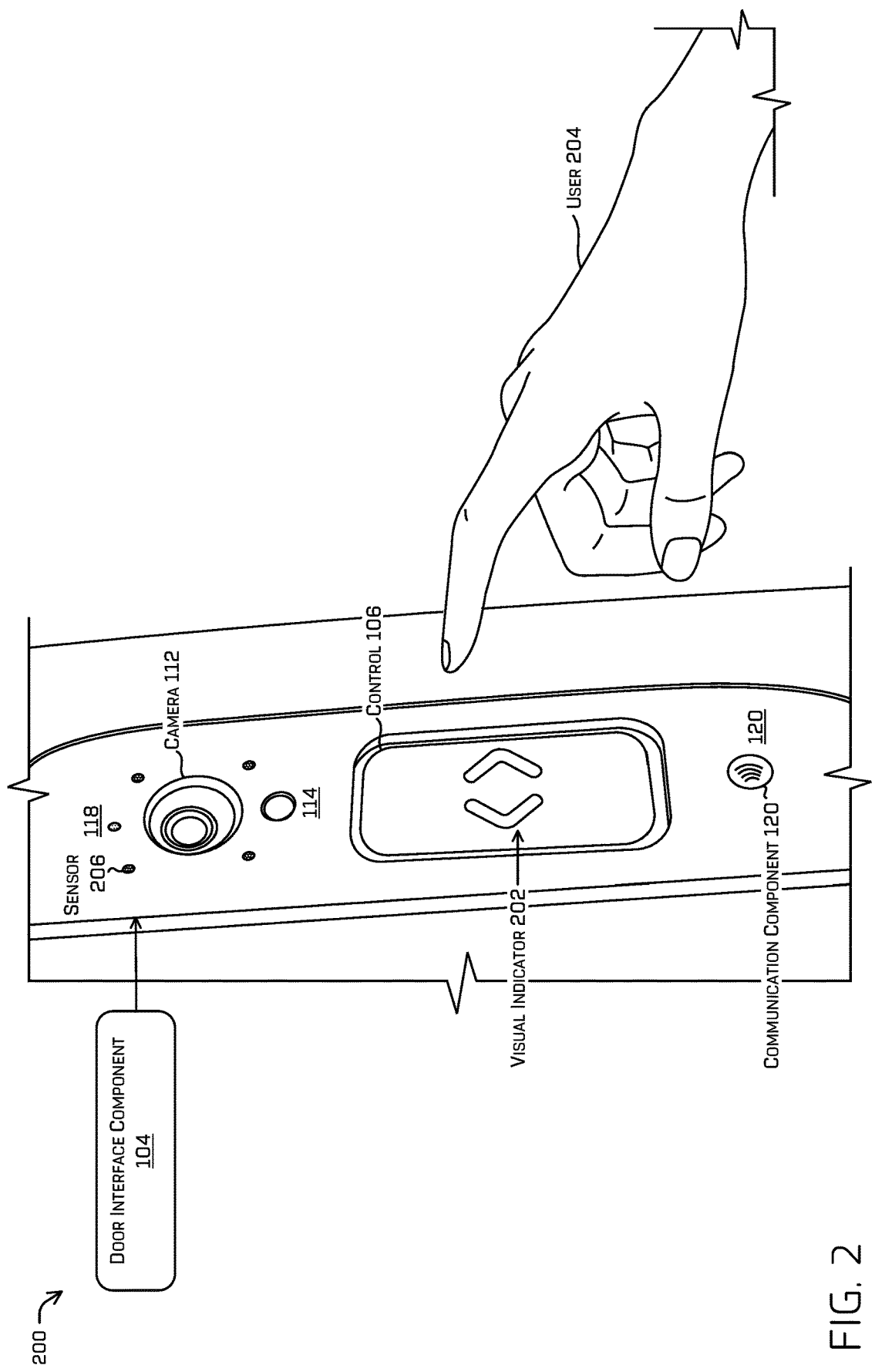
FIG. 2 is an illustration of an example door interface component performing example interaction techniques as described herein.

FIG. 2 is an illustration of an example door interface component 200 performing example interaction techniques as described herein. For example, the door interface component 104 can configure one or more visual indicators associated with the control 106 to cause the door 122 to operate, to initiate a communication, and so on. Generally, the control 106 can represent a single button that outputs different functionality based on the configuration (e.g., color, time of presentation, brightness, animation, etc.) of a visual indicator 202 and an authentication state of user 204.

As shown in FIG. 2, the visual indicator 202 represents arrows (e.g., green arrows opposing one another) to indicate to the user 204 that the door 122 can open responsive to the door interface component 104 determining that the user 204 touched, hovered, or otherwise interacted with the control 106. In some examples, the door interface component 104 can output the visual indicator 202 based on the user 204 previously being authorized to interact with the door interface component 104. For instance, the user 204 can interact with a sensor of the door interface component 104 (e.g., the camera 112 or other sensor), an application associated with the door interface component 104, and/or a computing device associated with the door interface component 104 to initiate authentication. The user 204 may be authenticated to operate the door 122 as an authenticated user based on the door interface component 104 validating an authentication status of the user 204.

A position of the visual indicator 202 can vary relative to the control 106. For example, the visual indicator 202 can appear in different regions of the control 106 or in an area adjacent to the control 106. As shown in FIG. 2, the visual indicator 202 occupies a center region of the control 106, though in other examples the visual indicator 202 may appear in an upper region or lower region of the control 106. Although the example of FIG. 2 shows the visual indicator 202 as arrows, other symbols, words, and other indications are also possible. For instance, the visual indicator 202 can represent other text or visual indication to use another door other than the door 122.

The visual indicator 202 can include colored arrows to communicate that the doors are unlocked (e.g., green) or locked (e.g., red). The door interface component 104 may present the visual indicator 202 along with an audio indicator to convey whether the door 122 is locked, unlocked, or functioning properly (e.g., capable of fulling opening, etc.) In some examples, the visual indicator 202 can include a lock or other symbol instead of or in addition to the arrows. In various examples, the lock represented by the visual indicator 202 can change color (e.g., green when the doors are unlocked or red when the doors are locked) and/or intensity (e.g., brighter to darker, darker to brighter, etc.) for presentation to the user 204. As described herein, the visual indicator 202 can include one or more of: a symbol (e.g., a phone, a lock, etc.), text (e.g., "help"), transmission waves, and the like to communicate potential functionality employed by interacting with the control 106.

In some examples, the visual indicator 202 can include at least the functionality discussed in relation to the visual indicators 108 and 110 of FIG. 1. In some examples, the door interface component 104 can include braille to perform the interaction techniques described herein (e.g., braille in the control 106 can enable a user to move the vehicle, ask for help, or hire the vehicle).

FIG. 2 further illustrates a sensor 206 proximate the LED 118, the camera 112, and the audio interface 114. In various examples, the sensor 206 can represent an infrared sensor usable during image capture or detection of the user 204, as well as in at least some examples to determine a location of a contact point (e.g., a fingertip) of the user 204 when interacting with the control 106.

By way of example and not limitation, the user 204 can interact with the door interface component 104 to cause the vehicle 102 to move (e.g., navigate from a current position to another position). For instance, the user 204 (an authenticated user or an unauthenticated user) can interact with the control 106 to cause the vehicle 102 to determine a trajectory that moves the vehicle to another position in an environment. In some examples, the user 204 can request a move by initiating a communication to a remote operator based on one or more interactions with a sensor, a camera, an audio interface (the audio interface 114), a communication component (e.g., the communication component 120, the communication connection(s) 610), and/or a control (e.g., the control 106) of the door interface component 104. The remote operator can confirm whether the vehicle should move responsive to the request from the user 204 (e.g., the remote operator can receive data from the door interface component 104 and/or sensor data from one or more sensors of the vehicle 102 to "see" the environment of the vehicle 102 via one or more user interfaces of a remote computing device). In examples when the vehicle 102 can safely move, the remote operator can send a signal to the vehicle 102 validating the relocation request, and the vehicle 102 can determine a trajectory to cause the vehicle to move to another location. In examples when the vehicle 102 cannot or should not safely move, the remote operator can send a signal indicating that the vehicle should remain in place.

In some examples, an unauthenticated user (or group of unauthorized users) can interact with the door interface component 104, and a remote computing device can receive a communication from the vehicle 102 to analyze the environment and determine whether the vehicle 102 should move. For instance, a machine learned algorithm (or human operator) associated with the remote computing device can differentiate between a malicious request to move the vehicle (e.g., the vehicle is not blocking an area when the unauthenticated user interacts with the vehicle 102) and a valid request to move the vehicle (e.g., moving the vehicle 102 improves safety to a passenger and/or a rider being picked up, limits potential for interaction with an obstacle, etc.). In this way, the vehicle 102 can move in scenarios when the vehicle 102 is blocking a road, driveway, or person, but also remain in place to pick up a passenger when an unauthenticated user asks that the vehicle 102 move but the passenger is within a threshold distance to a door of the vehicle and/or a rider is within the vehicle 102 and the relocation is unnecessary.

Figure 3A:
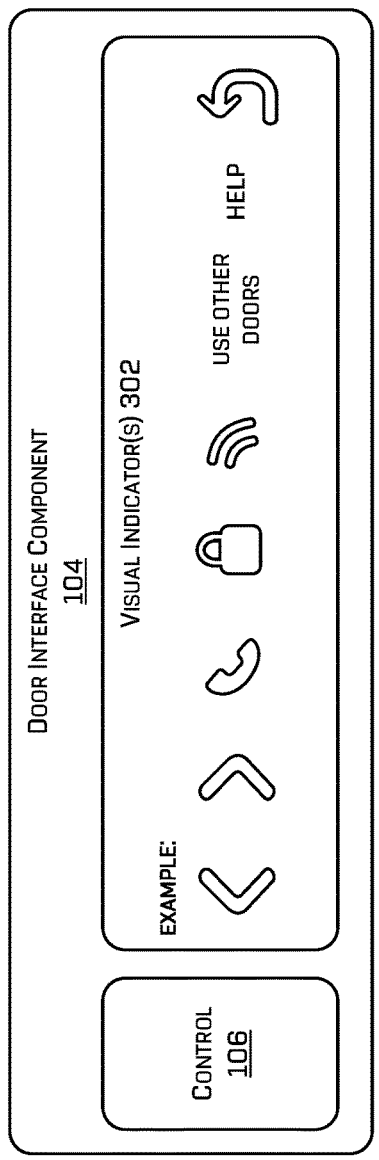
FIG. 3A is an illustration of example visual indicator(s) of an example door interface component for performing example interaction techniques as described herein.

FIG. 3A is an illustration of example visual indicator(s) 302 of an example door interface component (the door interface component 104) for performing example interaction techniques as described herein. In some examples, the visual indicator(as) 302 can be associated with the control 106.

In some examples, the visual indicator(s) 302 can include one or more of: a left arrow, a right arrow, an up arrow, a down arrow, a circular or partially circular arrow, a phone symbol, a lock symbol, a communication symbol (e.g., waveforms), "help" text, "use other doors" text, just to name a few. In some examples, the visual indicator 302 can include colored arrows to communicate that the doors are unlocked (e.g., green) or locked (e.g., red). The door interface component 104 may present the visual indicator(s) 302 in a variety of colors, sizes, shapes, and brightness over a period of time to gain the attention of the user (e.g., green arrows and a green lock can be presented when the doors are unlocked and red arrows and a red lock can be presented when the doors are locked). The visual indicator(s) 302 can include a symbol, text, and the like, to communicate functionality associated with the door 122 or the vehicle 102.

The door interface component 104 can output the visual indicator(s) 302, "use other doors", for example, when a user is proximate a door that is unsafe to enter (e.g., sensor data detects an object moving near the door, the door is not operating properly (is broken or will not fully open). In this way, the door interface component 104 can present a reason for not allowing operation of the door while also conveying to the user that another door is available to enter the vehicle 102. Of course, other text or visual indicator(s) may be used to make clear that another door other than the door proximate the user should be accessed.

Figure 3D:
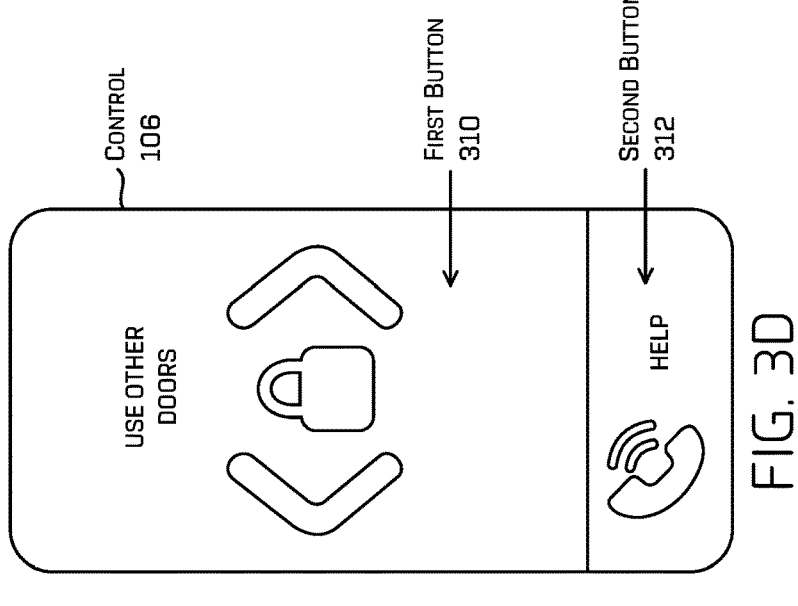
FIGS. 3B, 3C, and 3D are illustrations of example configurations of an example door interface component for performing example interaction techniques as described herein.
Figure 3C:
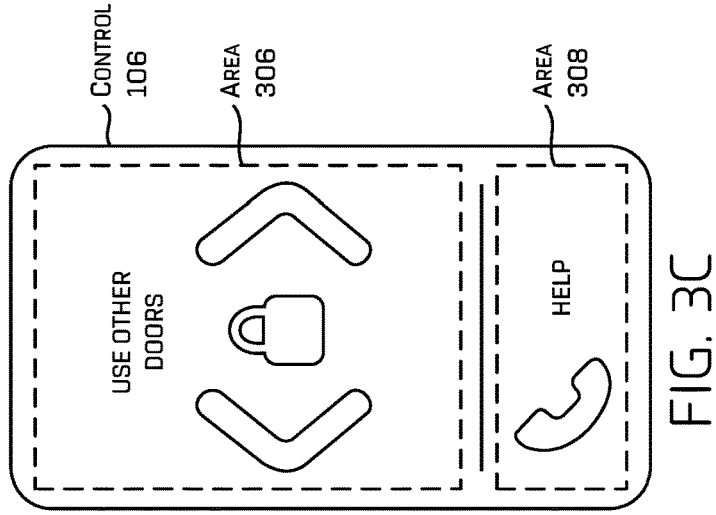
Figure 3B:
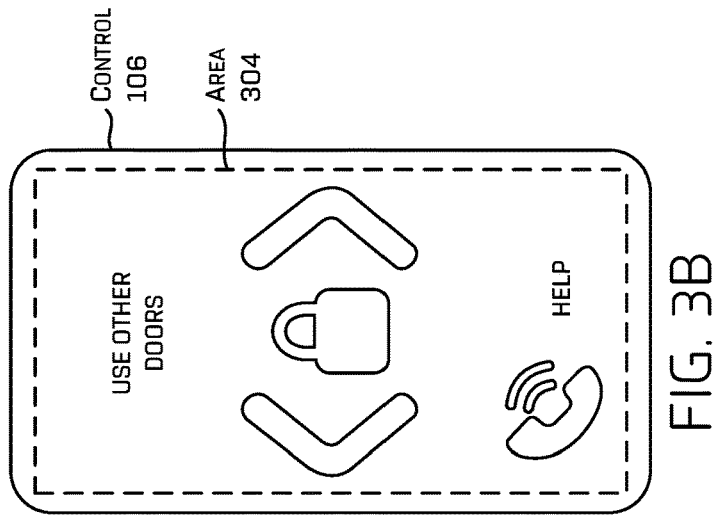

FIGS. 3B, 3C, and 3D are illustrations of example configurations of an example door interface component 104 for performing example interaction techniques as described herein. For example, the door interface component 104 can output text, an image, a video, and/or audio to interact with an authenticated and an unauthenticated user Generally, the door interface component 104 can configure the control 106 to perform different functionality (e.g., present a visual indicator, etc.) based on an authentication state of a user that may interact, or has already interacted with, the control 106. For instance, the door interface component 104 can determine that a user (e.g., the user 204) is adjacent to (within a few meters) the door 122 based on sensor data associated with a senor of the door interface component 104 and/or a sensor associated with the vehicle 102 (e.g., the sensor system(s) 606 of FIG. 6). In some examples, the door interface component 104 can determine which of one or more visual indicators 302 to output for display in the control 106 based on whether the user is associated with an authenticated state or an unauthenticated state. In some examples, the visual indicator(s) 302 can include at least the functionality discussed in relation to the visual indicators 108 and 110 of FIG. 1 and the visual indicator 202 of FIG. 2.

As shown in FIG. 3B, the door interface component 104 can output the visual indicator(s) 302 for display in an area 304 of the control 106. As shown, the area 304 can extend to substantially each edge of the control 106 and the visual indicator(s) 302 can be presented in any portion within the area 304. FIG. 3C shows an example in which the control 106 includes an area 306 and an area 308 each of which can be associated with the visual indicator(s) 302.

As shown in FIG. 3D, the control 106 can be associated with a first button 310 and a second button 312 usable to interact with the user. For instance, the first button 310 can be initiate functionality associated with a visual indicator (e.g., arrows to open the door) and the second button 312 can be associated with another visual indicator to generate a call for help (e.g., to an emergency service provider or to a remote operator that authorizes users). The door interface component 104 can receive an input from the first button 310 to open or close a door based on the visual indicator(s) 302 being red arrows, green arrows, a green lock, a red lock, and so on, and/or receive another input from the second button 312 to initiate a communication (e.g., a message over a network to a device and/or to an application). In examples when the door interface component 104 transmits the communication to an emergency service provider or other remote operator, and the is not yet connected, a flashing waveform symbol can be shown along with the phone symbol. When the door interface component 104 receives an indication that the communication is connected to a device the waveforms can remain visible for the duration of the communication session.

In some examples, the area 304, the area 306, and/or the area 308 can be associated with a liquid crystal display, or other display technology usable to output the visual indicator(s) 302. The area 304, the area 306, and/or the area 308 can include functionality to receive an input from a user. For example, one or more touch sensors, mechanical buttons, and the like can be included in the areas of the control 106 to enable the door interface component 104 to receive one or more inputs from a user. Additionally or alternatively, a user can provide an input by contacting the control 106 with sufficient force to cause the control 106 to change from a first position to a second position.

Figure 4:
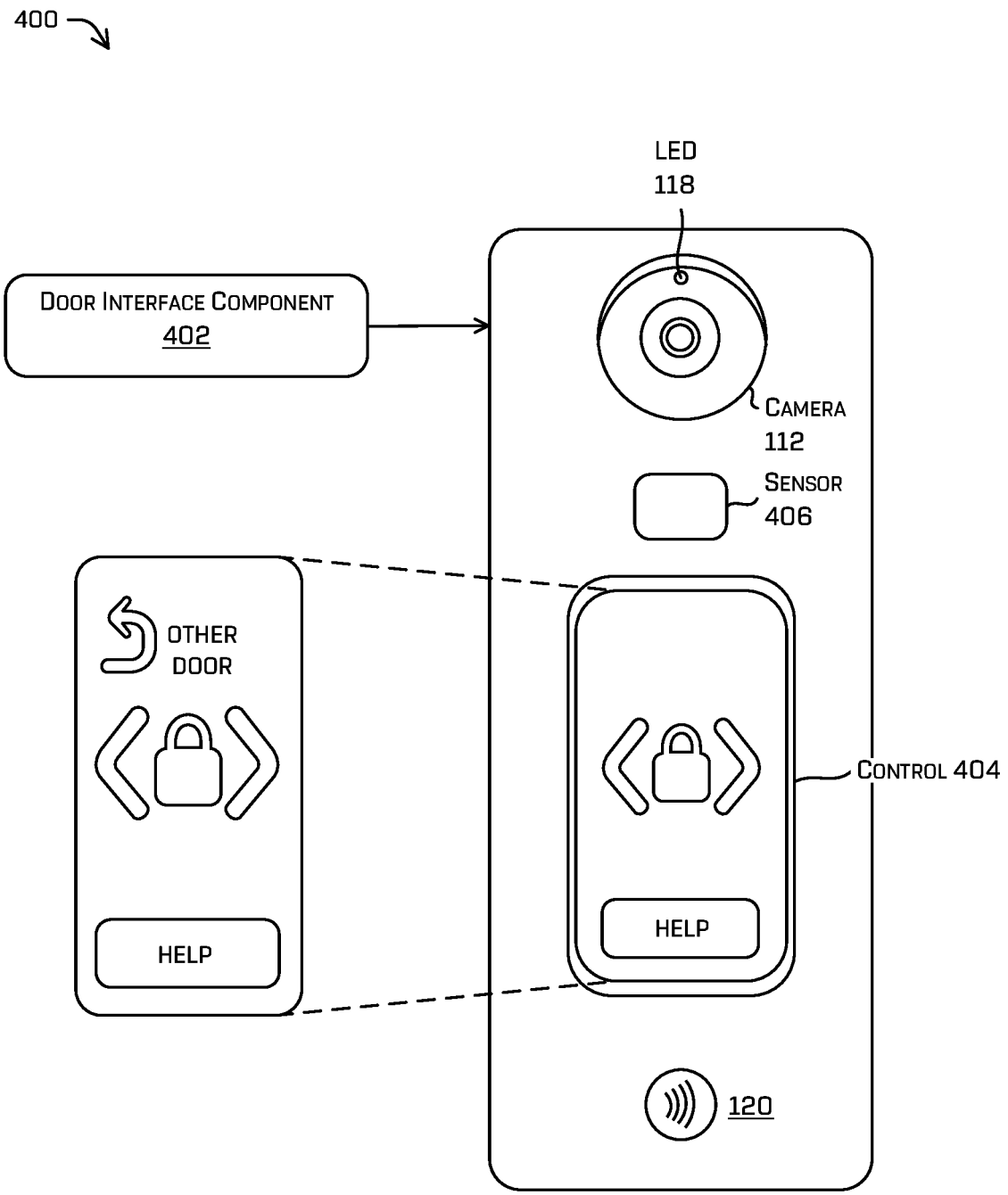
FIG. 4 is an illustration of additional example configurations of an example door interface component for performing example interaction techniques as described herein.

FIG. 4 is an illustration of additional example configurations 400 of an example door interface component for performing example interaction techniques as described herein. For instance, a door interface component 402 can be configured to perform at least the functionality described in relation to the door interface component 104 of FIG. 1.

FIG. 4 depicts example visual indicators such as arrows, a lock, and text "other door" and "help" that may appear in the door interface component 402 based on different scenarios. In some examples, the control 404 can include one or more of the visual indicators in FIG. 4 to enable potential user interactions. The visual indicators associated with the control 404 can also include one or more of the visual indicator(s) 302.

FIG. 4 illustrates the door interface component 402 comprising the camera 112, the LED 118, the communication component 120, the control 404, a sensor 406, and several of the visual indicators shown in FIG. 4. In various examples, the control 404 can include the functionality associated with the control 106 of FIG. 1. The sensor 406 can represent an infrared sensor, an ultrasonic sensor, a proximity sensor, or other sensor type.

As shown in FIG. 4, the control 404 can include a lock, a left arrow, a right arrow, and "help" text to give a user an option to operate a door (e.g., the door 122) associated with the door interface component 402, or request help (e.g., emergency help or help from a remote operator that authorizes a user to interact with the door interface component 402). In some examples, the arrows and lock shown in FIG. 4 can appear green when the user is authenticated, or red (or yellow) when the user is unauthenticated. The control 404 may, for example, be configured as a single button having a first position and a second position. In such examples, the user can initiate door operation or the help request by touching an area of the control 404 corresponding to the respective visual indicator. For instance, the control 404 can have different interactive zones to detect when the user touches an area near the lock and arrows or another area that encompasses the "help" text. Alternatively, the control can be configured with two buttons, one for operating the door and another for initiating a communication (e.g., with one button having a raised edge relative to an edge of the other button). Note that the location of the visual indicators, the camera 112, the LED 118, the control 404, the sensor 406, etc. can vary in size, appearance, position, etc. while maintaining the interaction techniques described herein.

Figure 5:
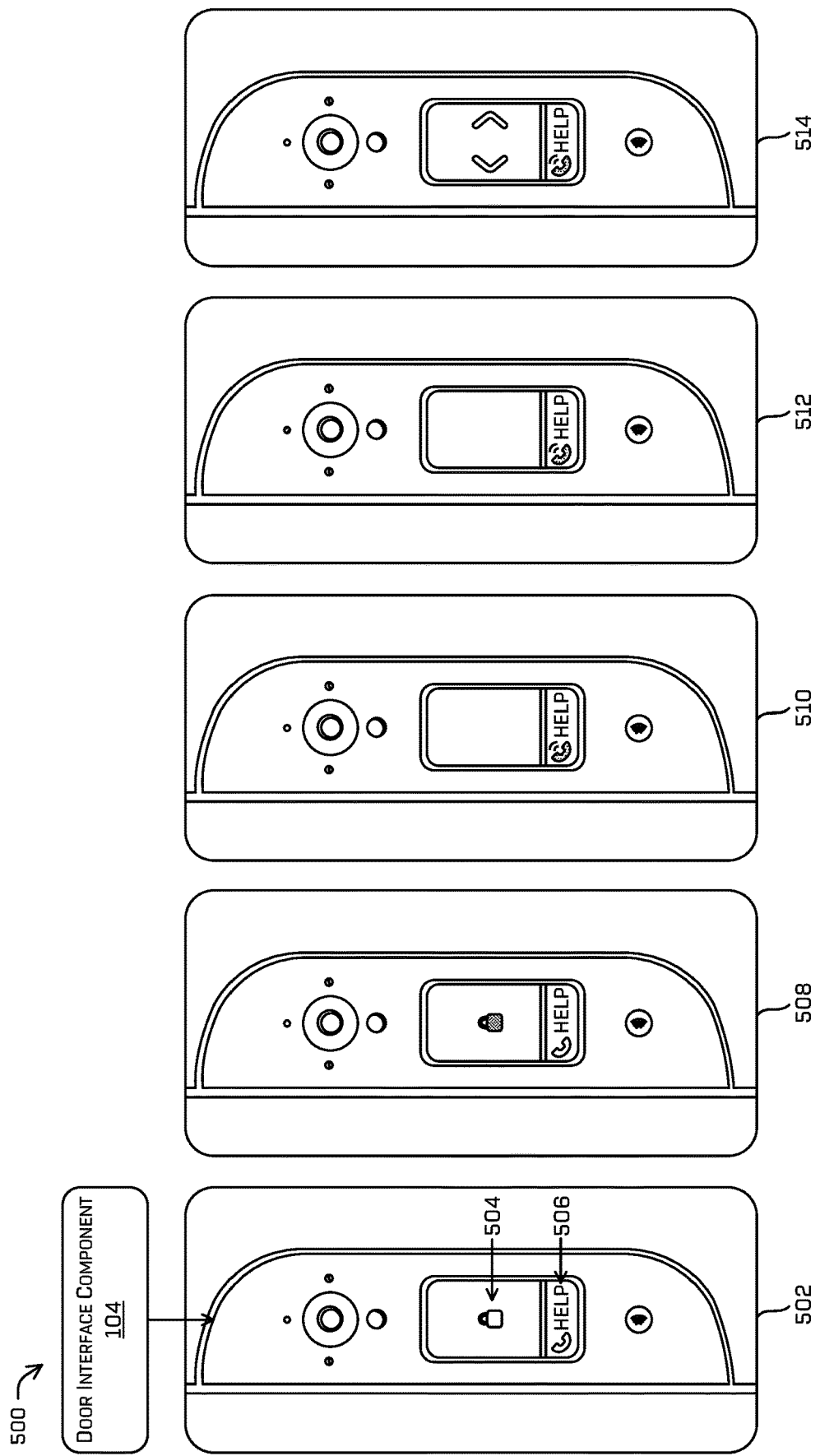
FIG. 5 is an illustration of example configurations of an example door interface component for performing example interaction techniques as described herein.

FIG. 5 is an illustration of example configurations of an example door interface component for performing example interaction techniques as described herein. For instance, the example door interface component can represent the door interface component 104 of FIG. 1 or the door interface component 402 of FIG. 4.

At 502, FIG. 5 depicts a visual indicator 504 and a visual indicator 506 in an example scenario in which an unauthenticated approaches the door interface component 104. The door interface component 104 may present the visual indicators 504 and 506 responsive to the door interface component 104 determining that the user is within a threshold distance of the control 106. For example, when the user approaches a door associated with the door interface component 104, the visual indicator 504 can represent a green lock to indicate that the door is locked. The door interface component 104 may also or instead present the visual indicator 506 which represents a symbol of a phone and "help" text to convey to the user that the control may be used to initiate a communication.

At 508, FIG. 5 depicts an example when the user presses the control 106 at 508, causing the door interface component 104 to present the visual indicator 504 as a red lock (shown with shading) and/or the visual indicator 506 as a phone symbol with "help" text to indicate to the user that door access is denied. In some examples, the visual indicator 504 and/or the visual indicator 506 may be displayed on a display device of the control 106 for a period of time (e.g., five seconds) after which the visual indicator 504 may return to a state indicating a green lock.

At 510, FIG. 5 represents a configuration of the door interface component 104 responsive to the user pressing the control 106 during presentation of the red lock and/or the phone/help indicators at 508. In FIG. 5C, the visual indicator 504 (e.g., the red lock) is removed and the visual indicator 506 (the phone and help text) changes from a first color (e.g., white) to a second color (e.g., blue) while optionally blinking to indicate that the door interface component 104 generated a communication to authenticate the user. In some examples, the LED 118 can flash to coincide with the blinking of the visual indicator 506. In such examples, a pre-recorded message can instruct the user to press the control 106 again to initiate a call for customer service. In examples when the user does not press the control 106 for a pre-determined time, the visual indicators 504 and 506 can return to the state described in relation to 502.

At 512, FIG. 5 depicts an example when the user presses the control 106 at 510 to cause the door interface component 104 to present the visual indicator 506 as a phone symbol with "help" text with more intensity (e.g., greater brightness) and/or lack of blinking relative to 510. In this way, the visual indicator 506 at 512 can convey to the user that an active call was established (e.g., the door interface component 104 established a communication session responsive to transmitting the communication to a computing device). In some examples, the LED 118 can illuminate while the communication session is active. The audio interface 114 can exchange audio between the user and an operator of the computing device as part of the communication session. Further, the camera 112 can capture data representing an image and/or video for sending to the computing device as part of the communication session. The data can be used by the computing device to verify an identify of the user. In some examples, the data from the camera 112 can be used by a vehicle computing device to verify the identity of the user independent of sending the data to the remote operator.

The operator of the computing device can represent a human in a call center supporting a fleet of vehicles for hire. The operator can instruct the user to access an application, website, QR code, etc. for authentication and/or can authenticate the user (e.g., such as when a mobile device is unavailable to the user) and may optionally communicate with a mobile device of the user. The computing device of the operator can perform various authentication techniques including verifying payment, verifying a user identity based on an image from the camera 112 or information provided by the user prior to and/or during the communication session.

At 514, FIG. 5 represents a configuration of the door interface component 104 responsive to the user being authenticated during a communication at 512. For example, the door interface component 104 can present the visual indicator 504 as green arrows that, if selected by the user, cause the door(s) associated with the door interface component 104 to open. After the communication session ends, the door interface component 104 can change the visual indicator 506 to reduce brightness and/or no longer animate the phone symbol or the "help" text.

In various example, audio may also be output by the door interface component 104 associated with any of the examples described in relation to 502, 508, 510, 512, and/or 514.

Figure 6:
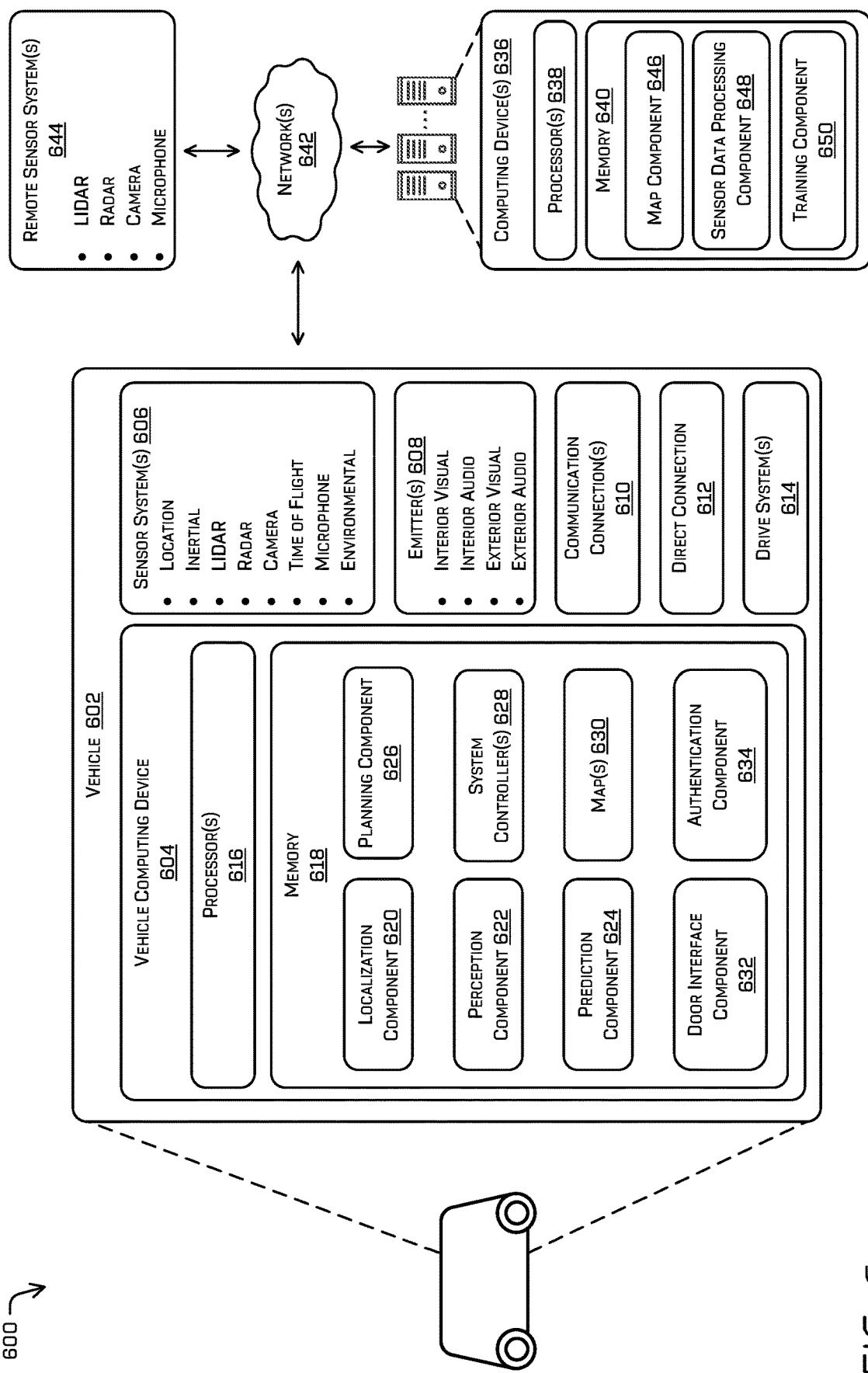
FIG. 6 is a block diagram of an example system for implementing the techniques described herein.

FIG. 6 is a block diagram of an example system 600 for implementing the techniques described herein. In at least one example, the system 600 may include a vehicle, such as vehicle 602.

The vehicle 602 may include a vehicle computing device 604, one or more sensor systems 606, one or more emitters 608, one or more communication connections 610, at least one direct connection 612, and one or more drive system(s) 614.

The vehicle computing device 604 may include one or more processors 616 and memory 618 communicatively coupled with the one or more processors 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In various examples, the vehicle computing device 604 may store sensor data associated with actual location of an object at the end of the set of estimated states (e.g., end of the period of time) and may use this data as training data to train one or more models. In some examples, the vehicle computing device 604 may provide the data to a remote computing device (i.e., computing device separate from vehicle computing device such as the computing device(s) 636) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In the illustrated example, the memory 618 of the vehicle computing device 604 stores a localization component 620, a perception component 622, a prediction component 624, a planning component 626, one or more system controllers 628, one or more maps 630, a door interface component 632, and an authentication component 634. Though depicted in FIG. 6 as residing in the memory 618 for illustrative purposes, it is contemplated that the localization component 620, the perception component 622, the prediction component 624, the planning component 626, one or more system controllers 628, one or more maps 630, the door interface component 632, and/or the authentication component 634 may additionally, or alternatively, be accessible to the vehicle 602 (e.g., stored on, or otherwise accessible by, memory remote from the vehicle 602, such as, for example, on memory 640 of a remote computing device 636).

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630 and/or map component 646, and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 624 can generate one or more probability maps representing prediction probabilities of possible locations of one or more objects in an environment. For example, the prediction component 624 can generate one or more probability maps for vehicles, pedestrians, animals, and the like within a threshold distance from the vehicle 602. In some instances, the prediction component 624 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 624 may generate predicted trajectories of objects (e.g., objects) in an environment and/or to generate predicted candidate trajectories for the vehicle 602. For example, the prediction component 624 may generate one or more predicted trajectories for objects within a threshold distance from the vehicle 602. In some examples, the prediction component 624 may measure a trace of an object and generate a trajectory for the object based on observed and predicted behavior.

In general, the planning component 626 may determine a path for the vehicle 602 to follow to traverse through an environment. For example, the planning component 626 may determine various routes and trajectories and various levels of detail. For example, the planning component 626 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 626 may generate an instruction for guiding the autonomous vehicle along at least a portion of the route from the first location to the second location. In at least one example, the planning component 626 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 626 can select a trajectory for the vehicle 602 based at least in part on receiving data representing an output of the door interaction component 632 (e.g., data indicating that the vehicle 602 should be moved).

In other examples, the planning component 626 can alternatively, or additionally, use data from the localization component 620, the perception component 622, and/or the prediction component 624 to determine a path for the vehicle 602 to follow to traverse through an environment. For example, the planning component 626 can receive data from the localization component 620, the perception component 622, and/or the prediction component 624 regarding objects associated with an environment. Using this data, the planning component 626 can determine a route to travel from a first location (e.g., a current location) to a second location (e.g., a target location) to avoid objects in an environment. In at least some examples, such a planning component 626 may determine there is no such collision free path and, in turn, provide a path which brings vehicle 602 to a safe stop avoiding all collisions and/or otherwise mitigating damage. Additionally or alternatively, the planning component 626 can determine the path for the vehicle 602 to follow based at least in part on data received from the door interface component 632.

In at least one example, the vehicle computing device 604 may include one or more system controllers 628, which may be configured to control steering, propulsion, braking, safety, emitters, communication, and other systems of the vehicle 602. The system controller(s) 628 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 624, and/or the planning component 626 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 642. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

As illustrated in FIG. 6, the vehicle computing device 604 may include a door interface component 632. The model component 632 may be configured to perform the functionality of the door interface component 104 and the door interface component 402, including controlling door operation, initiating a communication, etc. In various examples, the door interface component 632 may receive one or more features associated with the detected object(s) from the perception component 622 and/or from the sensor system(s) 606. In some examples, the door interface component 632 may receive environment characteristics (e.g., environmental factors, etc.) and/or weather characteristics (e.g., weather factors such as snow, rain, ice, etc.) from the perception component 622 and/or the sensor system(s) 606. While shown separately in FIG. 6, the door interface component 632 could be part of the prediction component 624, the planning component 626, or other component(s) of the vehicle 602.

In various examples, the model component 632 may send determinations that may be used by the prediction component 624 and/or the planning component 626 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 626 may determine one or more actions (e.g., reference actions and/or sub-actions) for the vehicle 602, such as vehicle candidate trajectories. In some examples, the model component 632 may be configured to determine visual indicator(s) (e.g., the visual indicators 108, 110, 202, and/or 302) based at least in part on the one or more actions for the vehicle 602.

The authentication component 634 can provide functionality to authenticate a user to enter or otherwise be associated with the vehicle 602 by determining an authenticated state or an unauthenticated state. The authentication component 634 can determine the authentication state of the user based at least in part on receiving data from an application of a mobile device associated with the user, a machine-readable code (e.g., a Quick Response (QR) code, barcode, Radio Frequency Identification (RFID) tag, and so on), or biometric identification (e.g., facial recognition, iris recognition, fingerprint, and the like).

The authentication component 634 can determine the authentication state based at least in part on data received from a camera (e.g., the camera 112), a sensor and/or a proximity technology detecting a proximity of a mobile device of the user (e.g., using Bluetooth, ultrawideband, NFC, WiFi, ultrasonic, and others). In various examples, the authentication component 634 may receive and/or access credentials from another entity such as an application used by the user to hire the vehicle 602, and verify the authentication state based at least in part on the credentials.

As can be understood, the components discussed herein (e.g., the localization component 620, the perception component 622, the prediction component 624, the planning component 626, the one or more system controllers 628, the one or more maps 630, the door interface component 632, and the authentication component 634 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 602 and a secondary safety system that operates on the vehicle 602 to validate operation of the primary system and to control the vehicle 602 to avoid collisions.

In some instances, aspects of some or all of the components discussed herein may include any models, techniques, and/or machine learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 642, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., remote computing device 636, other nearby vehicles, etc.) and/or one or more remote sensor system(s) 644 for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 642. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the prediction component 624, the planning component 626, the one or more system controllers 628, the one or more maps 630, the door interface component 632, and the authentication component 634 may process sensor data, as described above, and may send their respective outputs, over the one or more network(s) 642, to the computing device(s) 636. In at least one example, the localization component 620, the perception component 622, the prediction component 624, the planning component 626, the one or more system controllers 628, the one or more maps 630, the door interface component 632, and the authentication component 634 may send their respective outputs to the remote computing device(s) 636 at a particular frequency, after a lapse of a predetermined period of time, in near real-time, etc.

In some examples, the vehicle 602 may send sensor data to the computing device(s) 636 via the network(s) 642. In some examples, the vehicle 602 may receive sensor data from the computing device(s) 636 and/or remote sensor system(s) 644 via the network(s) 642. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640 storing the map component 646, a sensor data processing component 648, and a training component 650. In some examples, the map component 646 may include functionality to generate maps of various resolutions. In such examples, the map component 646 may send one or more maps to the vehicle computing device 604 for navigational purposes. In various examples, the sensor data processing component 648 may be configured to receive data from one or more remote sensors, such as sensor system(s) 606 and/or remote sensor system(s) 644. In some examples, the sensor data processing component 648 may be configured to process the data and send processed sensor data to the vehicle computing device 604, such as for use by the door interface component 632 and/or the authentication component 634. In some examples, the sensor data processing component 648 may be configured to send raw sensor data to the vehicle computing device 604.

In some instances, the training component 650 can include functionality to train a machine learning model to output evaluate trajectories. For example, the training component 650 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 650 may be executed by the processor(s) 638 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 650 can include functionality to train a machine learning model to output classification values. For example, the training component 650 can receive data that represents labelled collision data (e.g. publicly available data, sensor data, and/or a combination thereof). At least a portion of the data can be used as an input to train the machine learning model. Thus, by providing data where the vehicle traverses an environment, the training component 650 can be trained to output potential intersection(s) associated with objects, as discussed herein.

In some examples, the training component 650 can include training data that has been generated by a simulator. For example, simulated training data can represent examples where a vehicle collides with an object in an environment or nearly collides with an object in an environment, to provide additional training examples.

The processor(s) 616 of the vehicle 602 and the processor(s) 638 of the computing device(s) 636 may be any suitable processor capable of executing instructions to process data and perform operations as described herein. By way of example and not limitation, the processor(s) 616 and 638 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

Figure 7:
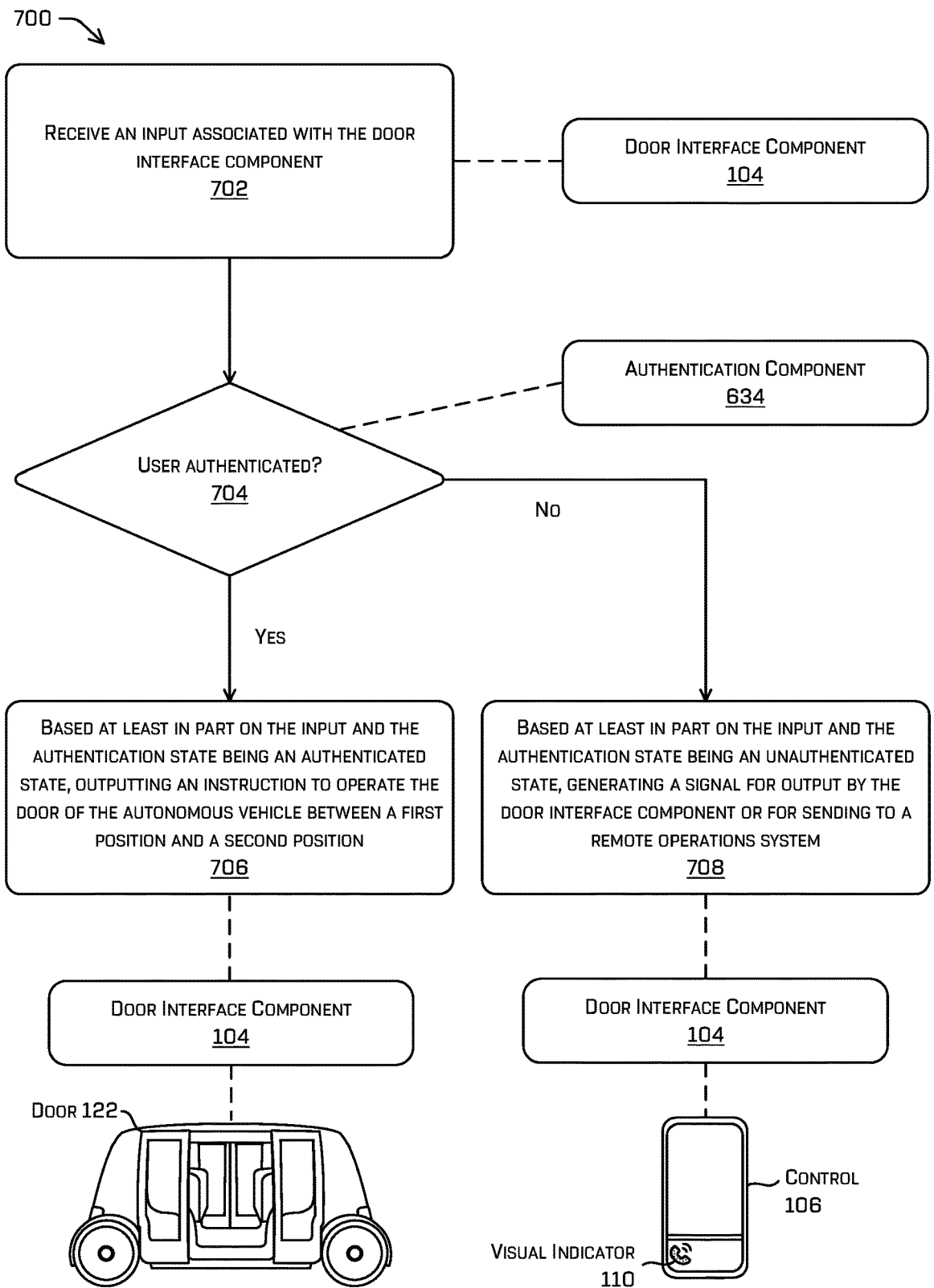
FIG. 7 is a flowchart depicting an example process for determining an interaction using an example door interface component.

FIG. 7 is a flowchart depicting an example process 700 for determining an interaction using an example door interface component. For example, some or all of the process 700 can be performed by one or more components in FIG. 6, as described herein. For example, some or all of the process 700 can be performed by the vehicle computing device 604 or the computing device(s) 636.

At operation 702, the process may include receiving an input associated with the door interface component. In some examples, the operation 702 may include a vehicle computing device implementing the door interface component 104 to receive an input from the control 106 (e.g., a button of the control 106). In various examples, the user can include a passenger that has hired the vehicle 602 for a fee, a potential passenger that wishes to hire the vehicle 602, a pedestrian, a person wanting to communicate with the vehicle 602, or a person wanting to communicate with a passenger within the vehicle 602, just to name a few. In various examples, the user may be authorized to enter the vehicle or may be unauthorized to enter the vehicle (based on not being authenticated). The operation 702 may include, in some examples, the door interface component 104 determining that the button changed from a first position to a second position (e.g., the button was pressed by the user).

At operation 704, the process may include determining whether the user is authenticated. In some examples, the operation 704 may include determining an authentication state associated with a user. For instance, a vehicle computing device can implement an authentication component that is configured to access data (e.g., credential information associated with a login, hiring status from an application, etc.) indicative of an authentication state of the user and/or the vehicle. In various examples, determining the authentication state can be based at least in part on proximity of a mobile device of the user to the vehicle, an application on the mobile device of the user to the vehicle, a machine-readable code, and/or biometric identification associated with the user.

In some examples, the authentication state can include an authenticated state in which the user is associated with the vehicle (e.g., authorized to ride in the vehicle) or an unauthenticated state in which the user is not associated with the vehicle (e.g., the user has not performed an operation to hire the vehicle). The authentication component can determine the authentication state based on accessing data from a memory, a database, or other storage device storing data associated with a ride service associated with a fleet of autonomous vehicles, such as the vehicle 602.

The operation 704 may be followed by the operation 706 if the user is authenticated (e.g., "yes" in the operation 704). The operation 704 may continue to operation 708 if the user is unauthenticated (e.g., "no" in the operation 704).

At operation 706, the process may include based at least in part on the input and the authentication state being an authenticated state, outputting an instruction to operate the door of the autonomous vehicle between a first position and a second position. In some examples, the operation 706 may include the door interface component 104 causing the door 122 of the vehicle 102 to change between a closed state associated with a first position and an open state associated with the second position. The operation 706 may also include outputting a first visual indicator based at least in part on the authentication state being the authenticated state. In such examples, the first visual indicator can include an indication to operate the button to open the door (e.g., the door 122), or an indication to use a specific door of the vehicle that is safest to open.

At operation 708, the process may include based at least in part on the input and the authentication state being an unauthenticated state, generating a signal for output by the door interface component or for sending to a remote operations system. In some examples, the operation 708 may include transmitting a communication over a network to cause the user to be authenticated by a remote operator. In some examples, the remote operations system may be associated with to an emergency service provider and the communication can request assistance to an emergency scenario in the vicinity of the vehicle. The operation 708 may also include outputting a second visual indicator (and/or audio) based at least in part on the authentication state being the unauthenticated state. In such examples, the second visual indicator can include an indication to initiate hiring the vehicle (e.g., at the vehicle or from a remote operator associated with the ride service) or to initiate generating a communication for emergency assistance to an emergency service provider (e.g., the control 106 can include the visual indicator 110 can be a phone symbol and a transmission wave symbol).

FIG. 7 illustrates an example process in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes. For instance, the process can include performing either the operation 706 or the operation 708.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: a door interface component coupled to a door of an autonomous vehicle; one or more processors; and one or more non-transitory computer-readable media storing instructions executable by the one or more processors, wherein the instructions, when executed, cause the system to perform operations comprising: receiving an input associated with the door interface component; determining an authentication state associated with a user; and based at least in part on the input and the authentication state, at least one of: outputting, based at least in part on the authentication state being an authenticated state, an instruction to operate the door of the autonomous vehicle between a first position and a second position, or generating, based at least in part on the authentication state being an unauthenticated state, a signal for output by the door interface component or for sending to a remote operations system.

B: The system of paragraph A, the operations further comprising outputting, based at least in part on the input, at least one of: a first visual indicator based at least in part on the authentication state being the authenticated state, or a second visual indicator based at least in part on the authentication state being the unauthenticated state.

C: The system of either paragraph A or B, wherein the authentication state is the unauthenticated state and the input is a first input, and the operations further comprising: receiving a second input from the remote operations system to place the authentication state associated with the user in the authenticated state.

D: The system of any one of paragraphs A-C, wherein the instruction is a first instruction, and the operations further comprising: outputting, based at least in part on the authentication state being the unauthenticated state a second instruction to cause the autonomous vehicle to navigate to an alternate location in an environment.

E: The system of any one of paragraphs A-D, wherein the door is a first door, and the operations further comprising: determining that the first door is unsafe to enter; and outputting, based at least in part on the authentication state being the authenticated state and the first door being unsafe to enter, a visual indicator to use a second door.

F: A method comprising: receiving an input signal from a door interface component of a vehicle; determining an authentication state of the vehicle, the authentication state indicative of whether a user is authorized to enter the vehicle; and causing an action based at least in part on the input signal and the authentication state, the action comprising: a first action based at least in part on the authentication state being an authenticated state, or a second action based at least in part on the authentication state being an unauthenticated state, the second action including outputting one or more options to the user for controlling the vehicle or transmitting an additional signal to a remote computing device.

G: The method of paragraph F, wherein: the door interface component comprises a button, the first action comprises opening a door of the vehicle or outputting a visual indicator indicative of whether it is safe to open the door, and the second action comprises outputting, on a display device for presentation to the user, the one or more options comprising a request that the vehicle move to another location, a request to initiate a communication for emergency assistance, or a request to hire the vehicle.

H: The method of either paragraph F or G, further comprising outputting, based at least in part on the input signal, at least one of: a first visual indicator based at least in part on the authentication state being the authenticated state, or a second visual indicator based at least in part on the authentication state being the unauthenticated state.

I: The method of any one of paragraphs F-H, wherein the authentication state is the unauthenticated state and the input signal is a first signal, and further comprising: receiving a second signal to place the authentication state of the vehicle in the authenticated state.

J: The method of any one of paragraphs F-I, further comprising: outputting, based at least in part on the authentication state being the unauthenticated state, an instruction to cause the vehicle to navigate to an alternate location in an environment.

K: The method of any one of paragraphs F-J, further comprising: determining that a first door is unsafe to enter; and outputting, based at least in part on the authentication state being the authenticated state and the first door being unsafe to enter, a visual indicator to use a second door.

L: The method of any one of paragraphs F-K, wherein the authenticated state is based at least in part on at least one of: proximity of a mobile device of a user to the vehicle, an application on the mobile device of the user to the vehicle, a machine-readable code, or biometric identification.

M: The method of any one of paragraphs F-L, wherein determining the authentication state of the vehicle occurs prior to receiving the input signal.

N: The method of any one of paragraphs F-M, wherein the second action comprises one of: causing the vehicle to move from a first position to a second position in an environment, initiating a first communication to authenticate the user, or initiating a second communication to request emergency assistance from an emergency service provider.

O: The method of paragraph N, wherein the second action is performed by a vehicle computing device of the vehicle.

P: The method of either paragraph N or O, further comprising: outputting, based at least in part on the input signal and the authentication state being the unauthenticated state, a set of commands to a display device of the vehicle or a mobile device of the user; and receiving a selection of a command from the set of commands via the display device or the mobile device, wherein causing the second action is further based at least in part on the command.

Q: One or more non-transitory computer-readable media storing instructions executable by one or more processors, wherein the instructions, when executed, cause the one or more processors to perform operations comprising: receiving an input signal from a control of a door interface component of a vehicle; determining an authentication state of the vehicle, the authentication state indicative of whether a user is authorized to enter the vehicle; and causing an action based at least in part on the input signal and the authentication state, the action comprising: a first action based at least in part on the authentication state being an authenticated state; or a second action based at least in part on the authentication state being an unauthenticated state, the second action including outputting one or more options to the user for controlling the vehicle or transmitting an additional signal to a remote computing device.

R: The one or more non-transitory computer-readable media of paragraph Q, further comprising outputting, based at least in part on the input signal, at least one of: a first visual indicator based at least in part on the authentication state being the authenticated state, or a second visual indicator based at least in part on the authentication state being the unauthenticated state.

S: The one or more non-transitory computer-readable media of either paragraph Q or R, wherein: the door interface component comprises a button, and the first action comprises opening a door of the vehicle or outputting a visual indicator indicative of whether it is safe to open the door.

T: The one or more non-transitory computer-readable media of any one of paragraphs Q-S, wherein the second action comprises one of: causing the vehicle to move from a first position to a second position in an environment, initiating a first communication to authenticate the user, or initiating a second communication to request emergency assistance from an emergency service provider.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a door interface component coupled to a first door of an autonomous vehicle;
   one or more processors; and
   one or more non-transitory computer-readable media storing instructions executable by the one or more processors, wherein the instructions, when executed, cause the system to perform operations comprising:
   receiving an input associated with the door interface component;
   determining an authentication state associated with a user;
   based at least in part on the input and the authentication state, at least one of:

outputting, based at least in part on the authentication state being an authenticated state, an instruction to operate the first door or a second do or of the autonomous vehicle between a first position and a second position, or generating, based at least in part on the authentication state being an unauthenticated state, a signal for output by the door interface component for sending to a remote operations system;

determining, based at least in part on sensor data from one or more sensors, whether it is safer to use the first door or the second door of the autonomous vehicle; and outputting, based at least in part on the input, at least one of:
a first visual indicator based at least in part on the authentication state being the authenticated state, or
a second visual indicator based at least in part on the authentication state being the unauthenticated state,
wherein the first visual indicator is positioned on or adjacent to the first door on a first side of the autonomous vehicle and indicates to use, based at least in part on whether it is safer to use the first door or the second door, the first door or the second door on a second side of the autonomous vehicle.

2. The system of claim 1, wherein the authentication state is the unauthenticated state and the input is a first input, and the operations further comprising:
receiving a second input from the remote operations system to place the authentication state associated with the user in the authenticated state.

3. The system of claim 1, wherein the instruction is a first instruction, and the operations further comprising:
outputting, based at least in part on the authentication state being the unauthenticated state a second instruction to cause the autonomous vehicle to navigate to an alternate location in an environment.

4. The system of claim 1, the operations further comprising:
determining that the first door is unsafe to enter; and
outputting, based at least in part on the authentication state being the authenticated state and the first door being unsafe to enter, the first visual indicator to use the second door.

5. The system of claim 1, wherein the input is a single input.

6. The system of claim 5, wherein determining the authentication state associated with the user is based at least in part on the single input.

7. A method comprising:
receiving an input signal from a door interface component of a vehicle;
determining an authentication state of the vehicle, the authentication state indicative of whether a user is authorized to enter the vehicle;
causing an action based at least in part on the input signal and the authentication state, the action comprising:
a first action based at least in part on the authentication state being an authenticated state indicating that the user is authorized to enter the vehicle, or
a second action based at least in part on the authentication state being an unauthenticated state indicating that the user is not authorized to enter the vehicle, the sec and action including outputting one or more options to the user for controlling the vehicle or transmitting an additional signal to a remote computing device;
determining, based at least in part on sensor data from one or more sensors, whether it is safe to open a door of the vehicle; and
outputting, based at least in part on the input signal, at least one of:
a first visual indicator based at least in part on the authentication state being the authenticated state, or
a second visual indicator based at least in part on the authentication state being the unauthenticated state,
wherein the first visual indicator is positioned on or adjacent to the door on a first side of the vehicle and indicates to use, based at least in part on whether it is safe to use the door, one of:
the door or another door on a second side of the vehicle.

8. The method of claim 7, wherein:
the door interface component comprises a button,
the first action comprises opening a door of the vehicle or outputting a visual indicator indicative of whether it is safe to open the door, and
the second action comprises outputting, on a display device for presentation to the user, the one or more options comprising a request that the vehicle move to another location, a request to initiate a communication for emergency assistance, or a request to hire the vehicle.

9. The method of claim 7, wherein the authentication state is the unauthenticated state and the input signal is a first signal, and further comprising:
receiving a second signal to place the authentication state of the vehicle in the authenticated state.

10. The method of claim 7, further comprising:
outputting, based at least in part on the authentication state being the unauthenticated state, an instruction to cause the vehicle to navigate to an alternate location in an environment.

11. The method of claim 7, the door being a first door and the another door being a second door, the method further comprising:
determining that the first door is unsafe to enter; and
outputting, based at least in part on the authentication state being the authenticated state and the first door being unsafe to enter, a visual indicator to use the second door.

12. The method of claim 7, wherein the authenticated state is based at least in part on at least one of: proximity of a mobile device of a user to the vehicle, an application on the mobile device of the user to the vehicle, a machine-readable code, or biometric identification.

13. The method of claim 7, wherein determining the authentication state of the vehicle occurs prior to receiving the input signal.

14. The method of claim 7, wherein the second action comprises one of:
causing the vehicle to move from a first position to a second position in an environment,
initiating a first communication to authenticate the user, or
initiating a second communication to request emergency assistance from an emergency service provider.

15. The method of claim 14, wherein the second action is performed by a vehicle computing device of the vehicle.

16. The method of claim 14, further comprising:
outputting, based at least in part on the input signal and the authentication state being the unauthenticated state, a set of commands to a display device of the vehicle or a mobile device of the user; and
receiving a selection of a command from the set of commands via the display device or the mobile device, wherein causing the second action is further based at least in part on the command.

17. The method of claim 7, wherein:
the first visual indicator identifies a door to enter the vehicle, and
the second visual indicator indicates a locked door or a communication to the remote computing device.

18. One or more non-transitory computer-readable media storing instructions executable by one or more processors, wherein the instructions, when executed, cause the one or more processors to perform operations comprising:
receiving an input signal from a control of a door interface component of a vehicle;
determining an authentication state of the vehicle, the authentication state indicative of whether a user is authorized to enter the vehicle;
causing an action based at least in part on the input signal and the authentication state, the action comprising:
a first action based at least in part on the authentication state being an authenticated state indicating that the user is authorized to enter the vehicle, or
a second action based at least in part on the authentication state being an unauthenticated state indicating that the user is not authorized to enter the vehicle, the second action including outputting one or more options to the user for controlling the vehicle or transmitting an additional signal to a remote computing device;
determining, based at least in part on sensor data from one or more sensors, whether it is safe to open a door of the vehicle; and
outputting, based at least in part on the input signal, at least one of:
a first visual indicator based at least in part on the authentication state being the authenticated state, or
a second visual indicator based at least in part on the authentication state being the unauthenticated state,
wherein the first visual indicator is positioned on or adjacent to the door on a first side of the vehicle and indicates to use, based at least in part on whether it is safe to use the door, one of: the door or another door on a second side of the vehicle.

19. The one or more non-transitory computer-readable media of claim 18, wherein:
the door interface component comprises a button, and
the first action comprises opening a door of the vehicle or outputting a visual indicator indicative of whether it is safe to open the door.

20. The one or more non-transitory computer-readable media of claim 18, wherein the second action comprises one of:
causing the vehicle to move from a first position to a second position in an environment,
initiating a first communication to authenticate the user, or
initiating a second communication to request emergency assistance from an emergency service provider.

* * * * *